US007934420B2

(12) United States Patent
Kama et al.

(10) Patent No.: US 7,934,420 B2
(45) Date of Patent: May 3, 2011

(54) TEST METHOD FOR AN EXHAUST GAS PROBE OF AN INTERNAL COMBUSTION ENGINE, IN PARTICULAR FOR A LAMBDA PROBE

(75) Inventors: Sayim Kama, Lappersdorf (DE); Norbert Sieber, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 231 days.

(21) Appl. No.: 12/204,749

(22) Filed: Sep. 4, 2008

(65) Prior Publication Data

US 2009/0056313 A1 Mar. 5, 2009

(30) Foreign Application Priority Data

Sep. 5, 2007 (DE) ........................ 10 2007 042 086

(51) Int. Cl.
*G01M 15/00* (2006.01)

(52) U.S. Cl. .................................................. 73/114.69

(58) Field of Classification Search ................ 73/114.69
See application file for complete search history.

(56) References Cited

U.S. PATENT DOCUMENTS 4,177,787 A * 12/1979 Hattori et al. ............ 123/198 D
5,488,858 A * 2/1996 Achleitner ................ 73/114.73
5,610,321 A * 3/1997 Shinmoto .................. 73/23.32
5,758,310 A * 5/1998 Kato ........................ 701/109
5,781,878 A * 7/1998 Mizoguchi et al. .......... 701/109
5,898,107 A * 4/1999 Schenk ...................... 73/114.71
6,034,610 A 3/2000 Schnaibel et al. ............ 340/635
6,164,125 A 12/2000 Kawase et al. .............. 73/118.1
6,343,499 B1 2/2002 Inagaki et al. .............. 73/23.32
6,439,038 B1 8/2002 Rösel et al. ................ 73/117.3
6,541,741 B2 * 4/2003 Ikeda ........................ 219/492
6,679,238 B2 * 1/2004 Nebiyeloul-Kifle et al. . 123/676
6,697,729 B2 * 2/2004 Wright ...................... 701/104
6,742,330 B2 * 6/2004 Genderen .................... 60/286
6,964,157 B2 * 11/2005 Adelman et al. .............. 60/278
6,996,499 B2 * 2/2006 Kurokawa et al. ............ 702/185
7,073,320 B2 * 7/2006 Moritsugu et al. ............ 60/276
7,085,644 B2 * 8/2006 Fath ........................ 701/107
7,150,145 B2 * 12/2006 Patchett et al. .............. 60/286
7,481,104 B2 * 1/2009 Schnaibel et al. ......... 73/114.73
7,499,792 B2 * 3/2009 Rosel et al. ................ 701/114
7,713,391 B2 * 5/2010 Inoue et al. ................ 204/401
2007/0089501 A1 * 4/2007 Endicott .................... 73/118.1
2008/0083211 A1 * 4/2008 Barnikow et al. .............. 60/273

FOREIGN PATENT DOCUMENTS

DE 19817761 10/1998
DE 19729696 2/1999
DE 19733107 2/1999
DE 19962654 12/1999

* cited by examiner

*Primary Examiner* — Freddie Kirkland, III
(74) *Attorney, Agent, or Firm* — King & Spalding L.L.P.

(57) ABSTRACT

A test method for an exhaust gas probe (8, 9) of an internal combustion engine (3), particularly for a lambda probe, has the following steps: Checking an output signal (λ1, λ2) of the exhaust gas probe (8, 9), detecting a fault state of the exhaust gas probe (8, 9) on the basis of the output signal (λ1, λ2) of the exhaust gas probe (8, 9) and differentiating between different fault states of the exhaust gas probe (8, 9).

18 Claims, 3 Drawing Sheets

TEST METHOD FOR AN EXHAUST GAS PROBE OF AN INTERNAL COMBUSTION ENGINE, IN PARTICULAR FOR A LAMBDA PROBE

CROSS-REFERENCE TO RELATED APPLICATIONS

This application claims priority to German Patent Application Number 10 2007 042 086.4 filed on Sep. 5, 2007, and which is incorporated herein by reference in its entirety.

TECHNICAL FIELD

The invention relates to a test method for an exhaust gas probe of an internal combustion engine, in particular for a lambda probe.

BACKGROUND

Modern internal combustion engines have a controlled catalytic converter for which the oxygen concentration in the exhaust of the internal combustion engine is measured by a lambda probe and used to control the internal combustion engine in order to minimize pollutant emissions of the internal combustion engine.

The lambda probes used for this purpose include binary (narrowband) types. One aspect of lambda probes of this kind is that they contain a ceramic whose surface is able to determine the oxygen concentration in the exhaust gas of the internal combustion engine, a corresponding voltage signal being fed out on an output line. Another aspect is that such lambda probes incorporate a heater to which a voltage is applied via heating wires in order to heat the lambda probe up to operating temperature, as lambda probes of this kind only operate properly in a particular temperature range.

During operation of the above-described heated lambda probes, various fault scenarios can arise which will be described briefly below.

In one fault scenario, the heater incorporated in the lambda probe is too weak to heat up the surface of the ceramic in the lambda probe to the required operating temperature or rather to maintain said operating temperature. The lambda probe then cools down and is therefore no longer functionally capable of correctly measuring the oxygen concentration in the exhaust gas of the internal combustion engine.

In another fault scenario, the output lines of the lambda probe are open-circuited, e.g. because of a wire break in the supply lead to the surface of the ceramic in the lambda probe, resulting in complete functional failure of the lambda probe.

Finally, in a third fault scenario the heating of the lambda probe by the integral lambda probe heater is insufficient, for operational reasons, to heat up the ceramic in the lambda probe to its operating temperature or maintain it at said operating temperature. This operation-related fault scenario can arise, for example, in the event of a cold start or when there is a momentary risk of water hammer, when the heating output is reduced for component protection. This scenario can also occur if the heater characteristic map is filled with incorrect data.

However, the legal exhaust gas regulations and in particular the exhaust gas regulations of the CARB (California Air Resources Board) require that the exhaust gas purification system must commence controlled operation as quickly as possible in the case of both a cold start and a warm start of the internal combustion engine. Otherwise, a time is specified within which a fault must be detected and stored in order to document that the exhaust gas regulations have not been complied with.

It is therefore known from the prior art to test the operability of the lambda probe so that when the internal combustion engine is cold-started there is a maximally fast transition to controlled operation of the exhaust gas purification system as soon as the lambda probe has been heated up to operating temperature. For this purpose, the output voltage and the internal resistance of the lambda probe can be measured. The hardware configuration of the lambda probe is such that, in the event of a wire break, the lambda probe voltage is held at a fixed potential and the Nernst cell internal resistance of the lambda probe diverges.

The problem with this conventional testing of the operability of the lambda probe is the fact that it is not possible to differentiate between the different fault scenarios described above. For example, weak lambda probe heating is manifested by a similar output voltage and internal resistance behavior of the lambda probe to that resulting from the above described wire breakage.

SUMMARY

According to an embodiment, a test method for an exhaust gas probe of an internal combustion engine may comprise the following steps: a) Checking an output signal of the exhaust gas probe, b) Detecting a fault state of the exhaust gas probe on the basis of the output signal of the exhaust gas probe, and c) Differentiating between different fault states of the exhaust gas probe.

According to a further embodiment, the following fault states of the exhaust gas probe can be differentiated: a) Wire break in an electrical lead of the exhaust gas probe and b) Heating fault due to excessively weak heating of the exhaust gas probe by an exhaust gas probe heater incorporated in the exhaust gas probe. According to a further embodiment, the excessively weak heating in the event of a heating fault can be caused by a) an unsatisfactory heater map controlling the exhaust gas probe heating, or b) aging-induced deterioration of the exhaust gas probe heating. According to a further embodiment, the test method may further comprise the following steps: a) Determining the thermal power applied to the exhaust gas probe by the exhaust gas of the internal combustion engine, and b) Taking the thermal power applied to the exhaust gas probe by the exhaust gas into account for differentiating between the different fault states of the exhaust gas probe. According to a further embodiment, the test method may also comprise the following steps: a) Determining the exhaust gas temperature of the internal combustion engine, b) Determining the intake mass airflow of the internal combustion engine, and c) Calculating the thermal power applied to the exhaust gas probe by the exhaust gas of the internal combustion engine from the exhaust gas temperature and the mass airflow. According to a further embodiment, a) the exhaust gas temperature may be determined by an exhaust gas temperature model, or b) the mass airflow may be measured by a mass airflow meter. According to a further embodiment, a) the exhaust gas temperature is determined by an exhaust gas temperature model, and b) the mass airflow is measured by a mass airflow meter. According to a further embodiment, the test method may comprise the following steps: a) Comparing the thermal power applied to the exhaust gas probe by the exhaust gas with a predefined limit value, b) Detecting the wire break if a fault state of the exhaust gas probe is detected and, in addition, the thermal power applied to the exhaust gas probe by the exhaust gas is less than the limit value, and c)

Detecting the heating fault if a fault state of the exhaust gas probe is detected and, in addition, the thermal power applied to the exhaust gas probe by the exhaust gas exceeds a limit value. According to a further embodiment, the test method may comprise the following steps: a) Determining a dew point, and b) Taking the dew point into account for the detection and/or differentiation of the fault states of the exhaust gas probe. According to a further embodiment, the test method may comprise the following steps: a) Measuring the time since starting of the internal combustion engine, b) Comparing the time since starting of the internal combustion engine with a predefined limit value, c) Setting a fault flag if a fault state of the exhaust gas probe is detected and if, in addition, the time since starting of the internal combustion engine exceeds the limit value. According to a further embodiment, the exhaust gas probe can be a) a lambda probe, b) a wideband lambda probe, c) a planar lambda probe or d) a nitrogen oxide sensor. According to a further embodiment, the internal combustion engine can be a) a gasoline engine, b) a diesel engine, c) a natural gas powered engine or d) a dual-fuel engine which can be run on different types of fuel. According to a further embodiment, the test method may comprise the following step: Storing fault-specific fault flags according to the fault states detected.

According to another embodiment, a control unit may be operable to carry out the steps of such a control method.

BRIEF DESCRIPTION OF THE DRAWINGS

Further embodiments will be explained in greater detail below together with the description with reference to the accompanying drawings in which.

DETAILED DESCRIPTION

Figure 1:
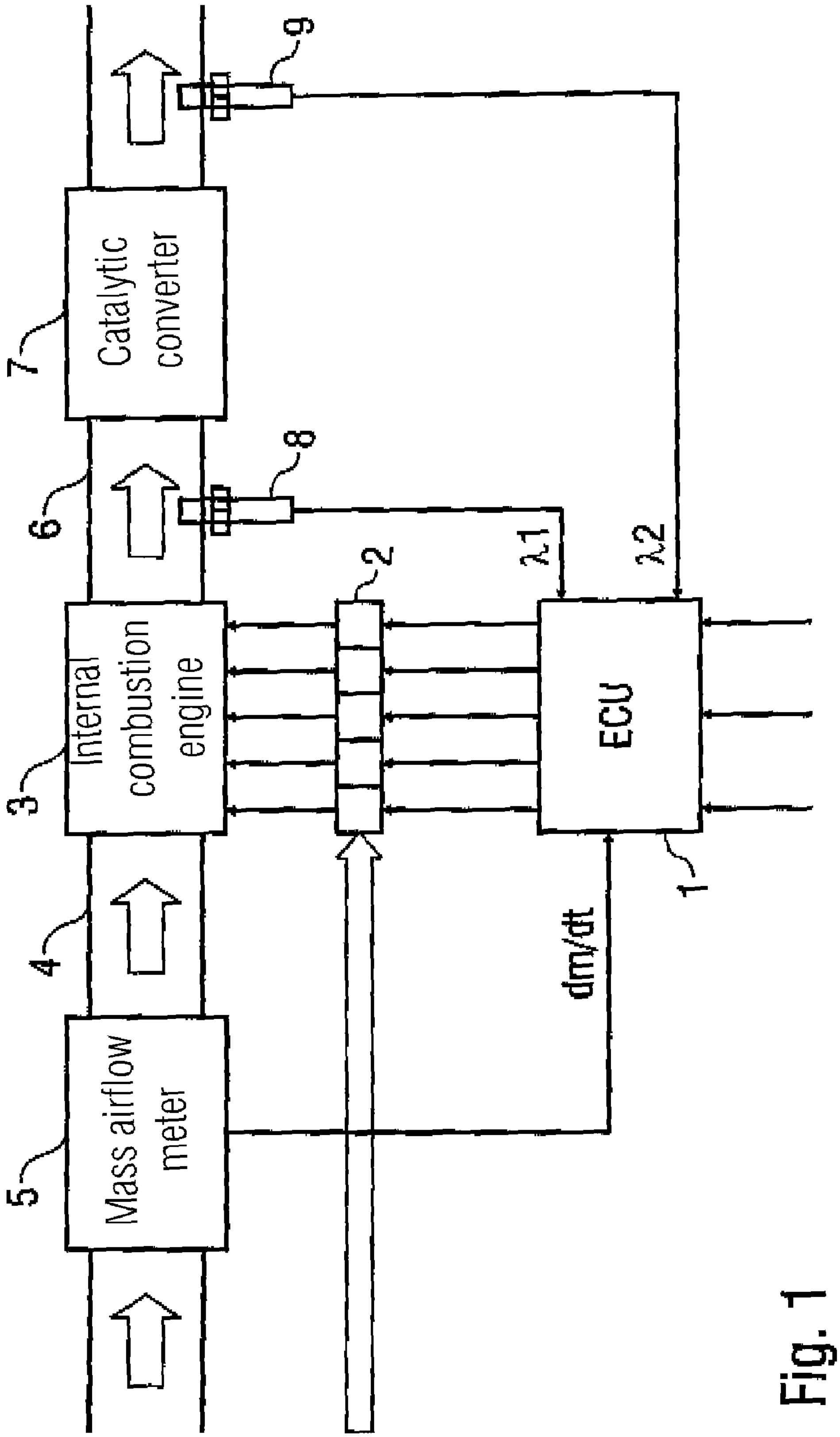
FIG. 1 schematically illustrates an internal combustion engine with a controlled catalytic converter and FIGS. 2A and 2B show the test method according to an embodiment in the form of a flowchart.

The method may comprise the general technical teaching that, for testing the lambda probe, different lambda probe fault scenarios are differentiated from one another.

The fault scenarios to be differentiated may be, for example, the fault scenarios already mentioned in the introduction. Thus, within the scope of the test method according to various embodiments, it is possible to differentiate, for example, between a wire break in an electrical lead of the exhaust gas probe and a heating fault due to weak heating of the exhaust gas probe by a heater incorporated in the exhaust gas probe. However, in respect of the different fault states of the exhaust gas probe, the invention is not limited to the abovementioned scenarios, but basically also encompasses variants in which other possible fault states of the lambda probe are differentiated.

Moreover, the test method according to various embodiments is not limited to a lambda probe, but can basically also be used with other exhaust gas sensors for internal combustion engines.

In the case of the above-described fault state of excessively weak heating of the lambda probe, the heating fault may be caused by an inadequate heater characteristic map controlling the exhaust gas probe heating, or by age-related deterioration of the exhaust gas probe heating.

In addition, the various embodiments provide for the thermal power applied to the exhaust gas probe by the exhaust of the internal combustion engine to be determined and taken into account for differentiating between the different fault states of the exhaust gas probe. For example, during operation of the exhaust gas purification system it is possible for the lambda probe to be heated up to the operating temperature anyway by the hot exhaust gas, independently of the heating by the integral lambda probe heater, so that a lambda probe fault cannot be due to excessively weak heating, but must have some other cause such as a wire break.

The exhaust gas temperature of the internal combustion engine can be preferably ascertained in order to determine the thermal power applied to the exhaust gas probe by the exhaust gas, it being possible for the exhaust gas temperature to be optionally determined by a measurement or on the basis of a model.

In addition, to determine the thermal power applied to the exhaust gas probe by the exhaust gas, the intake mass airflow of the internal combustion engine is also measured. Most modern internal combustion engines already have a mass airflow meter which measures the MAF intake, so that no additional probe is required for determining the mass airflow. From these values, an integral of the thermal power applied to the exhaust gas probe may then preferably be calculated in order to be able to determine the heating or cooling of the exhaust gas probe by the exhaust.

The thermal power integrated in this way may then preferably be compared with a predefined limit value. Depending on whether the predefined limit value is exceeded or undershot, either a wire break or a heater fault is then detected.

A wire break is present if a fault state of the exhaust gas probe is detected and, in addition, the thermal power applied to the exhaust gas probe by the exhaust gas exceeds the limit value, as the fault state cannot then be caused by the exhaust gas probe temperature being too low.

A heating fault, on the other hand, may preferably be detected when a fault state of the exhaust gas probe is detected and, in addition, the thermal power applied to the exhaust gas probe by the exhaust gas is below the limit value. A different limit value can also be used here.

It is additionally provided within the scope of the method according to various embodiments that the dew point is determined and taken into account for detecting and/or differentiating between the fault states of the exhaust gas probe.

It is further provided within the scope of the test method according to various embodiments that the time since starting of the internal combustion engine is measured and compared with a predefined limit value. A fault flag is then set if a fault state of the exhaust gas probe is detected and if, in addition, the time since starting of the internal combustion engine exceeds the limit value. This time limit is specified by the statutory exhaust gas regulations, as already explained in the introduction in connection with the prior art.

It should also be mentioned that the internal combustion engine can be either a gasoline engine, a diesel engine, a natural gas powered engine or a dual-fuel engine which can run on different types of fuel. However, in respect of the type of internal combustion engine, the invention is not limited to the types of engine mentioned above, but can in principle also be implemented with other engine types.

Finally, the invention encompasses not only the test method described above, but also an engine control unit suitable and equipped to carry out said test method. For this purpose, the engine control unit according to various embodiments preferably may have a program memory in which a control program is executed which carries out the test method.

FIG. 1 shows an electronic control unit (ECU) 1 which executes the test method according to an embodiment, as will be described in greater detail below.

The electronic control unit 1 controls the injection valves 2 of an internal combustion engine 3 as a function of the operating state of the internal combustion engine 3.

On the one hand, there is disposed in the intake tract 4 of the internal combustion engine 3 a mass airflow meter 5 which measures the mass flow of air dm/dt into the internal combustion engine 3 and forwards it to the electronic control unit 1.

On the other hand, there is disposed in the exhaust tract 6 of the internal combustion engine 3 a catalytic converter 7 which purifies the exhaust stream of the internal combustion engine 3 in the conventional manner.

Additionally disposed in the exhaust tract 6 of the internal combustion engine 3 upstream of the catalytic converter 7 and downstream of the catalytic converter 7 are two binary heated lambda probes 8, 9 which measure the oxygen concentration in the exhaust gas of the internal combustion engine 3 and forward it to the electronic control unit 1.

The electronic control unit 1 then controls the injection valves 2 as a function of the measured mass flow of air dm/dt and as a function of the measured lambda values λ1, λ2 in order to ensure that the catalytic converter 7 operates continuously in the optimum range, in order to ensure compliance with the legally defined exhaust gas regulations.

Figure 2A:
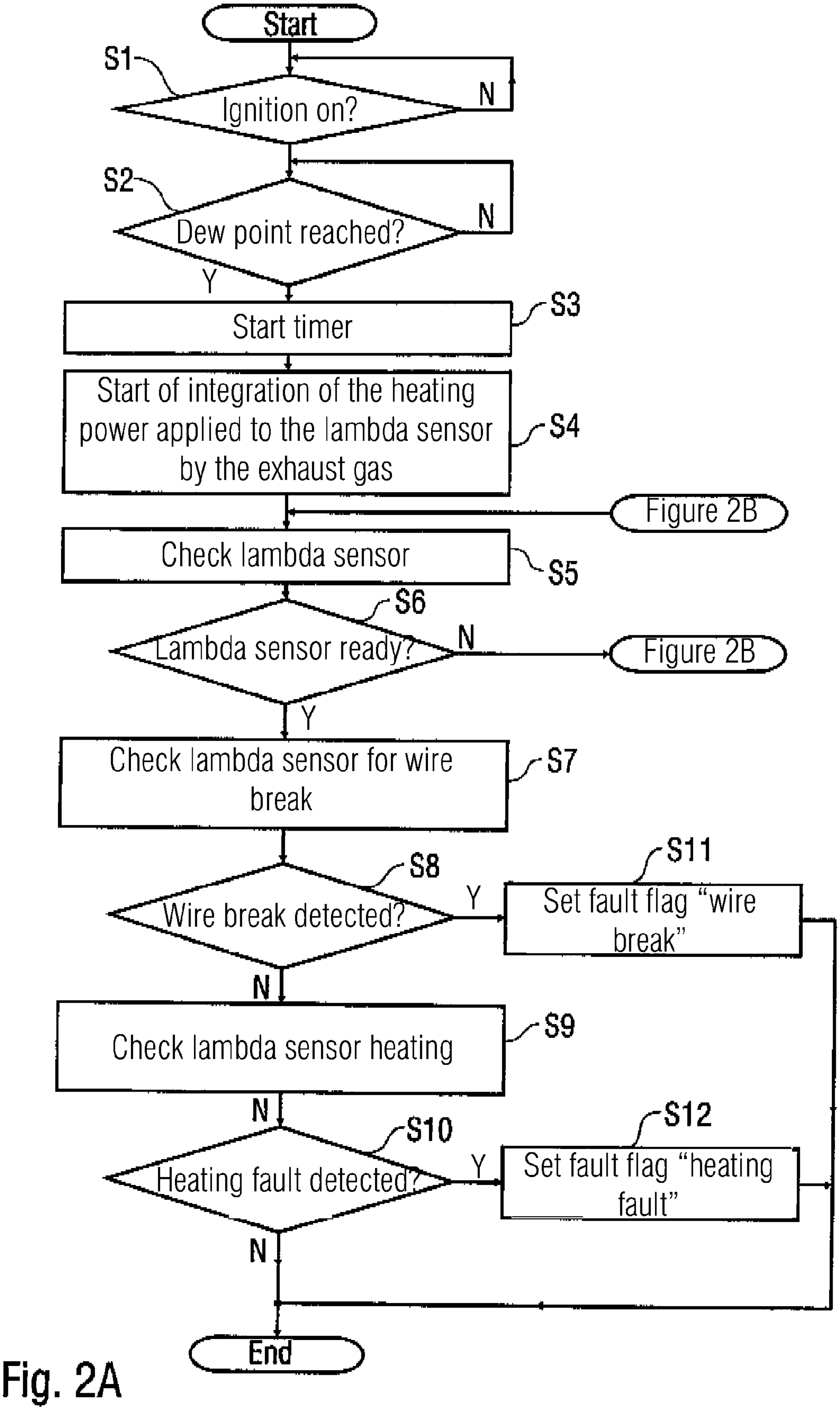

The test method with which the electronic control unit 1 checks the operability of the lambda probes 8, 9 while at the same time differentiating between different fault states will now be described with reference to the flowchart shown in FIGS. 2A and 2B. Although, for simplification, the test method will be described in respect of the lambda probe 8, it is also applied in a corresponding manner to the lambda probe 9.

In a first step S1 it is first checked whether the ignition of the internal combustion engine 3 is switched on, the test method only being continued if the ignition is ON.

In another step S2 it is then checked whether the dew point has been reached, the test method waiting until the dew point is attained.

When the dew point has been reached, a timer is then started in step S3 in order to subsequently check how long it takes for controlled operation of the exhaust gas purification system to commence.

In addition, in a step S4, the heating or cooling power applied to the lambda probe 8 by the exhaust gas is then continuously integrated. For this purpose the exhaust gas temperature is either determined on the basis of a model or measured by a temperature sensor not shown here for the sake of simplification.

In a step S5 the readiness of the lambda probe 8 is checked.

For this purpose, on the one hand, the output voltage of the lambda probe 8 is measured and compared with predefined limit values. Operational readiness of the lambda probe 8 is then assumed if the measured voltage exceeds the upper limit value or is below the lower limit value.

On the other hand, in order to check the readiness of the lambda probe 8, the internal resistance of the lambda probe 8 is measured. The lambda probe 8 is then assumed to be ready if the measured internal resistance of the lambda probe 8 is below a predefined limit value.

The two abovementioned criteria for the readiness of the lambda probe 8 are then ORed in a step S6, i.e. the lambda probe 8 is assumed to be ready if the internal resistance is below the predefined limit value and/or if the output voltage of the lambda probe is above or below one of the predefined limit values.

Figure 2B:
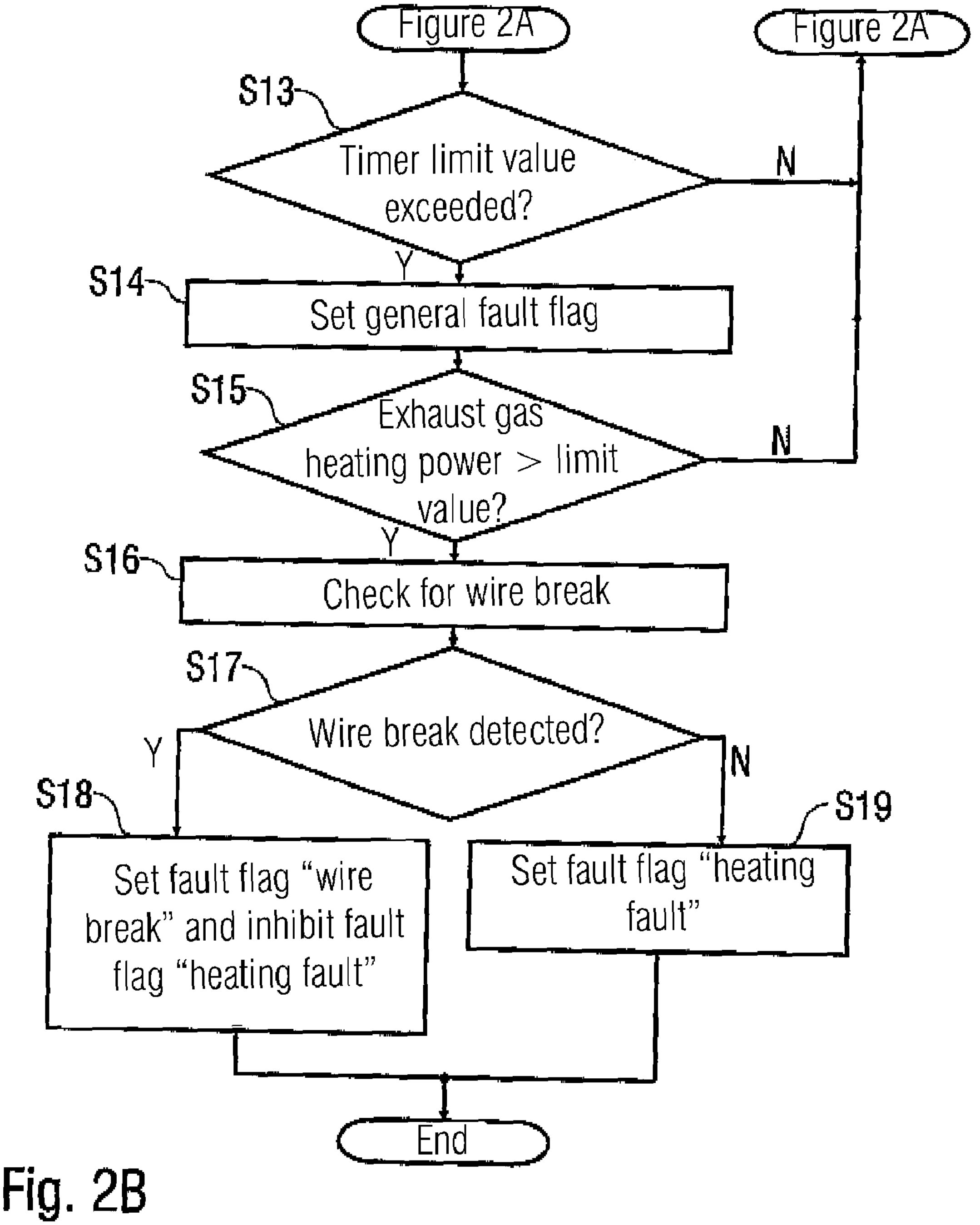

If this readiness check in step S5 indicates that the lambda probe 8 is not ready, the process continues at step S13 in FIG. 2B.

In step S13 it is checked whether the time that has elapsed since timer startup in step S3 exceeds a predefined limit value.

If this is the case, the process moves on to step S14 where a general fault flag is set, it not yet being clear whether the unreadiness of the lambda probe 8 is attributable to a wire break or caused by the heating of the lambda probe 8 being too weak.

In another step S15 it is then checked whether the integrated exhaust gas heating power applied to the lambda probe 8 exceeds a predefined limit value.

If this is the case, the wire break check is repeated in a further step S16, as already described above in connection with step S5. However, in step S16 the two criteria for the readiness of the lambda probe 8 are not ORed, but ANDed. This means that readiness of the lambda probe 8 is only assumed if the internal resistance of the lambda probe is below the predefined limit value and if, in addition, the output voltage of the lambda probe 8 is above the upper or below the lower limit value.

If, corresponding to this ANDing, a wire break is then detected in step S17, in step S18 a fault flag "wire break" is set which indicates a wire break of the lambda probe 8. In addition, the setting of a fault flag "heating fault" is then inhibited in step S18. It should be mentioned here that heating fault diagnostics waits until wire break diagnostics is complete.

If, on the other hand, the check in step S16 shows no wire break, in step S19 a fault flag "heating fault" is set, indicating a heating fault. However, if the time comparison in step S13 shows that the time that has elapsed since startup of the timer in step S3 does not yet exceed the predefined limit value, the test method loops back to step S5. This is useful because, in the case of a cold start, the lambda probe 8 is naturally not yet ready immediately after the starting process, as the lambda probe 8 is then not already heated up to the required operating temperature either by the exhaust gas of the internal combustion engine 3 or by the integral lambda probe heating.

If, on the other hand, the readiness check of the lambda probe 8 in step S6 shows the lambda probe 8 to be ready, the process moves on to step S7 where, in the manner already described above, the lambda probe 8 is checked for a wire break.

If this check shows no wire break, the process moves from step S8 to step S9 where the lambda probe heating is checked. If this check also yields a negative result and no lambda probe heating fault is therefore present, the test method is terminated.

However, if a heating fault is detected in step S10, an appropriate fault flag indicating a heating fault is set in step S12.

If, on the other hand, the check in step S7 results in a wire break being detected, a fault flag indicating a wire break is set in step S11.

What is claimed is:

1. A test method for an exhaust gas probe of an internal combustion engine comprising the following steps:

determining a heating power applied to the exhaust gas probe by exhaust gas of the internal combustion engine, integrating the heating power over time to determine a running total heating power, checking an output signal of the exhaust gas probe, measuring an internal resistance of the exhaust gas probe, detecting a fault state of the exhaust gas probe on the basis of at least the output signal of the exhaust gas probe and the running total heating power for a particular time period, differentiating between different causes of the detected fault state of the exhaust gas probe by comparing the output signal of the exhaust gas probe and the measured internal resistance of the exhaust gas probe to corresponding limit values, and setting a fault flag to indicate the differentiated fault state of the exhaust gas probe.

2. The test method according to claim 1, wherein the following causes of the detected fault state of the exhaust gas probe are differentiated:

a) wire break in an electrical lead of the exhaust gas probe and b) heating fault due to excessively weak heating of the exhaust gas probe by an exhaust gas probe heater incorporated in the exhaust gas probe, wherein a wire break is identified as the cause of the detected fault state if (a) the output signal of the exhaust gas probe exceeds an upper limit value or is below a first lower limit value and (b) the measured internal resistance of the exhaust gas probe is below a second lower limit value, and wherein a heating fault is otherwise identified as cause of the detected fault state.

3. The test method according to claim 1, wherein an excessively weak heating in the event of a heating fault is caused by a) an unsatisfactory heater map controlling the exhaust gas probe heating, or b) aging-induced deterioration of the exhaust gas probe heating.

4. The test method according to claim 1, comprising the following steps:

determining an exhaust gas temperature of the internal combustion engine, determining an intake mass airflow of the internal combustion engine, and calculating the heating power applied to the exhaust gas probe by the exhaust gas of the internal combustion engine from the exhaust gas temperature and the mass airflow.

5. The test method according to claim 4, wherein a) the exhaust gas temperature is determined by an exhaust gas temperature model, or b) the mass airflow is measured by a mass airflow meter.

6. The test method according to claim 4, wherein a) the exhaust gas temperature is determined by an exhaust gas temperature model, and b) the mass airflow is measured by a mass airflow meter.

7. The test method according to claim 1, comprising the following steps:

comparing the heating power applied to the exhaust gas probe by the exhaust gas with a predefined limit value, detecting a wire break if a fault state of the exhaust gas probe is detected and, in addition, the heating applied to the exhaust gas probe by the exhaust gas is less than the limit value, and detecting a heating fault if a fault state of the exhaust gas probe is detected and, in addition, the heating applied to the exhaust gas probe by the exhaust gas exceeds a limit value.

8. The test method according to claim 1, comprising the following steps:

determining a dew point, and taking the dew point into account for the detection and/or differentiation of the fault states of the exhaust gas probe.

9. The test method according to claim 1, comprising the following steps:

measuring a time since starting of the internal combustion engine, comparing the time since starting of the internal combustion engine with a predefined limit value, setting a general fault flag if a fault state of the exhaust gas probe is detected and if, in addition, the time since starting of the internal combustion engine exceeds the limit value.

10. The test method according to claim 1, wherein the exhaust gas probe is selected from the group consisting of:

a) a lambda probe, b) a wideband lambda probe, c) a planar lambda probe, and d) a nitrogen oxide sensor.

11. The test method according to claim 1, wherein the internal combustion engine is selected from the group consisting of:

a) a gasoline engine, b) a diesel engine, c) a natural gas powered engine, and d) a dual-fuel engine which can be run on different types of fuel.

12. The test method according to claim 1, comprising storing fault-specific fault flags according to the fault states detected.

13. A engine control unit being operable:

to determine a heating power applied to an exhaust gas probe by exhaust gas of an internal combustion engine, to integrate the heating power over time to determine a running total heating power, to check an output signal of an exhaust gas probe, to measure an internal resistance of the exhaust gas probe, to detect a fault state of the exhaust gas probe on the basis of at least the output signal of the exhaust gas probe and the running total heating power for a particular time period, to differentiate between different causes of the detected fault state of the exhaust gas probe by comparing the output signal of the exhaust gas probe and the measured internal resistance of the exhaust gas probe to corresponding limit values, and to set a fault flag to indicate the differentiated fault state of the exhaust gas probe.

14. The engine control unit according to claim 13, wherein the following causes of the detected fault state of the exhaust gas probe are differentiated:

a) wire break in an electrical lead of the exhaust gas probe and b) heating fault due to excessively weak heating of the exhaust gas probe by an exhaust gas probe heater incorporated in the exhaust gas probe, wherein a wire break is identified as the cause of the detected fault state if (a) the output signal of the exhaust gas probe exceeds an upper limit value or is below a first lower limit value and (b) the measured internal resistance of the exhaust gas probe is below a second lower limit value, and wherein a heating fault is otherwise identified as cause of the detected fault state.

15. The engine control unit according to claim 13, wherein an excessively weak heating in the event of a heating fault is caused by a) an unsatisfactory heater map controlling the exhaust gas probe heating, or b) aging-induced deterioration of the exhaust gas probe heating.

16. The engine control unit according to claim 13, being further operable to:

determine a heating power applied to the exhaust gas probe by the exhaust gas of the internal combustion engine, take the heating power applied to the exhaust gas probe by the exhaust gas into account for differentiating between the different fault states of the exhaust gas probe.

17. The engine control unit according to claim 16, being further operable to:

determine an exhaust gas temperature of the internal combustion engine, determine an intake mass airflow of the internal combustion engine, and to calculate the heating power applied to the exhaust gas probe by the exhaust gas of the internal combustion engine from the exhaust gas temperature and the mass airflow.

18. The engine control unit according to claim 17, wherein a) the exhaust gas temperature is determined by an exhaust gas temperature model, or b) the mass airflow is measured by a mass airflow meter.

* * * * *